United States Patent [19]
Shaklee et al.

[11] Patent Number: 5,373,347
[45] Date of Patent: Dec. 13, 1994

[54] STAGGERED MULTIPLE CRT'S IN A PHOTOGRAPHIC PROCESS PRINTER

[75] Inventors: Kerry L. Shaklee, Brighton; Donna M. Bodeau; Jo A. Frank, both of Littleton; Gary L. Brackett, Canon City, all of Colo.

[73] Assignee: Metrum, Inc., Littleton, Colo.

[21] Appl. No.: 195,779

[22] Filed: Feb. 14, 1994

[51] Int. Cl.5 .......................... G01D 9/42; G01D 9/02; H04N 5/76; G03B 27/00
[52] U.S. Cl. ...................... 355/20; 348/778; 348/779; 346/110 R; 346/108; 347/110
[58] Field of Search .................. 355/20; 348/778, 779; 346/110 R, 1.1, 108

[56] References Cited

U.S. PATENT DOCUMENTS

| | | | |
|---|---|---|---|
| 4,918,467 | 4/1990 | Sanford | 346/110 R |
| 4,996,552 | 2/1991 | Sangyoji et al. | 355/20 |
| 5,077,680 | 12/1991 | Sturm et al. | 395/105 |
| 5,084,656 | 1/1992 | Sturm et al. | 315/364 |
| 5,165,073 | 11/1992 | Shahlee et al. | 346/110 R |
| 5,204,691 | 4/1993 | Sanford | 346/1.1 |
| 5,239,243 | 8/1993 | Rothe et al. | 315/367 |
| 5,250,878 | 10/1993 | Rothe et al. | 315/383 |

Primary Examiner—Michael L. Gellner
Assistant Examiner—Daniel P. Malley
Attorney, Agent, or Firm—James R. Young

[57] ABSTRACT

A photographic printer that uses a plurality of small CRTs to print wide format images. Within the printer, the CRTs are positioned horizontally adjacent one another but vertically displaced so that image segments displayed by adjacent CRTs either abut or overlap one another. The printer decomposes each line of the image into horizontal image segments, buffers the image segments to compensate for the vertical displacement, and displays the image segments on the CRTs such that they are exposed horizontally aligned with one another on the photographic media. The printer stitches the image at the seams between adjacent segments to reduce the discontinuities in the horizontal image rows.

12 Claims, 7 Drawing Sheets

STAGGERED MULTIPLE CRT'S IN A PHOTOGRAPHIC PROCESS PRINTER

FIELD OF THE INVENTION

This invention relates to printers for computer systems and more particularly to Cathode Ray Tube (CRT) display subsystems within such printers. Even more particularly, the present invention relates to an apparatus and methods for utilizing a plurality of such CRT's to permit printing of wide format images.

BACKGROUND OF THE INVENTION

Photographic process printers use a cathode ray tube (CRT) to project an image onto a photosensitive media. After the image is projected onto the media, the media is processed to develop the latent image. In order to transfer the image from the surface of the CRT to the surface of the media while maintaining image focus, an array of optical fibers are adapted to transfer the light from the surface of the CRT to the surface of the media.

A problem exists when applying this technology to create wide format images on wide format photosensitive media. Large CRTs are inherently complex in their design due to factors relating to the wide ranging sweep of the electron beam within the CRT and the difficulty of manufacturing a large glass envelope. Retaining the quality required for the print process of photographic printer devices requires large CRTs representing significant cost and complexity in the resulting photographic printer device. A practical limit on the CRT width in these applications is less than the width desired for wide format photosensitive media.

One apparent option is to divide the image horizontally onto a plurality of smaller CRTs. This option presents problems in that CRTs cannot be physically mounted horizontally adjacent one another so as to create a seamless horizontal image row. All known CRT devices are manufactured with some non-imageable area at their horizontal sweep limits. Additionally, physical thickness of the CRT glass envelope material will preclude precise, horizontal, seamless alignment of the plurality of partial images on the CRTs.

Although optical fibers are used to transfer the image from the projection surface of each CRT onto the surface of the photosensitive media, these fibers must remain short enough to prevent excessive loss of image light intensity. The short length of the optical fibers precludes physical recomposition of the whole image by simply bending the optical fibers so that the fibers at the ends of adjacent partial image segments are abutted.

It is thus apparent that there is a need in the art for an improved method or apparatus which permits efficient transfer of a wide format image onto photosensitive media from a plurality of CRTs.

SUMMARY OF THE INVENTION

It is an aspect of the present invention to provide an apparatus for decomposing a wide format image into partial images on a plurality of CRTs and for transferring the plurality of partial images onto a wide format print media recomposed to form a whole image.

It is another aspect of the present invention to provide a control mechanism to permit the plurality of partial images on the CRTs to be vertically staggered and still recompose the decomposed image to form a whole image.

Yet another aspect of the present invention is to provide methods and apparatus for smoothing or "stitching" the photographic image at the seams where partial images from two adjacent CRTs are joined.

The above and other aspects of the present invention are accomplished with a control mechanism and associated control methods which decompose the whole image vertically as well as horizontally. Horizontal segments of the whole image are each individually imaged through a separate one of a plurality of small CRTs. This control approach permits the plurality of CRTs along with the associated optical fiber image transfer means to be vertically staggered with respect to one another. The vertical stagger of the plurality of small CRTs permits the partial images to horizontally abut or overlap one another. As the photosensitive media moves vertically across the multiple CRT images, the control mechanism causes the desired segments of the horizontal rows to be imaged onto the media. The control mechanism provides buffering and associated control methods and circuits to image the horizontal segments onto the media while delaying the imaging of the corresponding remaining horizontal segments until the media has moved to the correct vertical position to cause the image to be recomposed.

In addition, the control processes and apparatus of the present invention provide for various methods of "stitching" at the seam of two adjacent portions of the recomposed horizontal image row. These methods help to smooth any visual discontinuities which may arise due to the physical mounting alignment of adjacent CRTs.

BRIEF DESCRIPTION OF THE DRAWINGS

The above and other aspects, features, and advantages of the present invention will be better understood by reading the following more particular description of the invention, presented in conjunction with the following drawings, wherein.

DETAILED DESCRIPTION OF THE PREFERRED EMBODIMENT

The following description is of the best presently contemplated mode of practicing the present invention. This description is not to be taken in a limiting sense but is made merely for the purpose of describing the general principles of the invention. The scope of the invention should be determined by referencing the appended claims.

Figure 1:
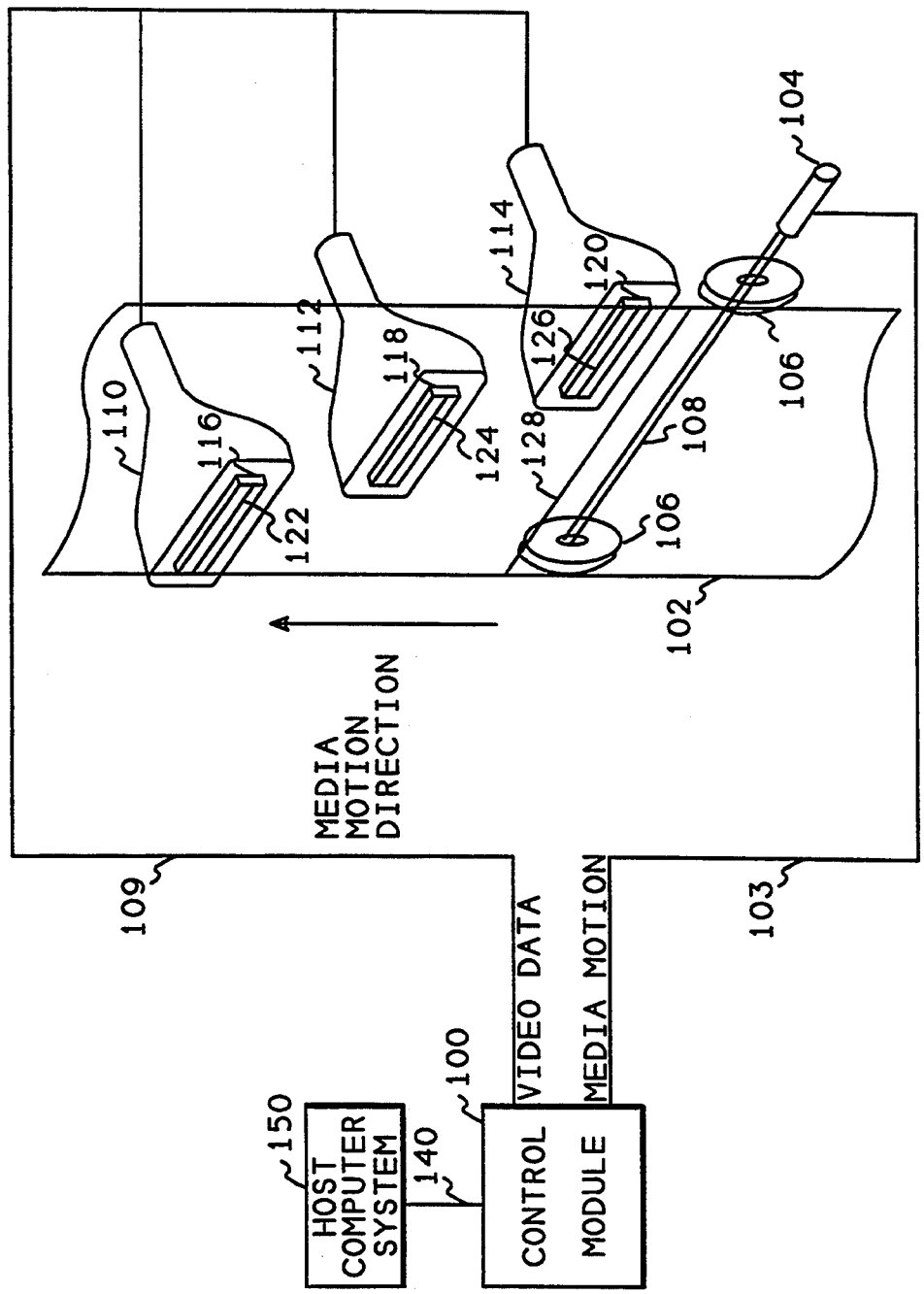
FIG. 1 shows a block diagram of essential elements of a printer incorporating a plurality of staggered CRTs of the present invention.

FIG. 1 shows a block diagram of the essential elements of a photographic printer incorporating the apparatus of the present invention. Control module 100 receives image data from a host computer system 150 over host interface 140. The image data received is reproduced on photosensitive media 102 by projecting the image from cathode ray tubes (CRTs) positioned in close proximity to photosensitive media 102. The image data is projected from the CRTs one row at a time as media 102 is moved vertically upward until all rows of the image have been reproduced as a latent image on media 102. Media 102 is then moved on to a development process (not shown) to develop and fix the latent image.

In FIG. 1, three CRTs 110, 112, and 114 are shown staggered vertically in the direction of movement of photosensitive media 102. Fiber optic bundles 116, 118, and 120 are affixed to the front surface of CRTs 110, 112, and 114 respectively to transfer the focused image from the surface of the CRT to the photosensitive media 102.

Control module 100 controls servo motor 104 through media motion signal 103 to turn shaft 108 clockwise. Drive rollers 106 are attached to shaft 108 and cause photosensitive media 102 to move vertically upward since media 102 is pinched between drive rollers 106 and opposing pinch rollers (not shown). Image row 128 on media 102 moves vertically upward as media 102 is moved vertically upward by the controlled rotation of drive rollers 106. Control module 100 causes media 102 to move vertically until image row 128 is vertically aligned with horizontal image segment 126 transferred from the surface of CRT 114 by fiber optic bundle 120. Control module 100 then causes CRT 114 to project the first segment of image row 128 onto media 102 through fiber optic bundle 120. The remaining two segments required to complete image row 128 remain buffered within control module 100. Control module 100 then moves media 102 vertically upward until image row 128 is aligned with horizontal image segment 124, and the image is transferred from the surface of CRT 112 by fiber optic bundle 118 to the media on image row 128. As image row 128 on media 102 is moved between horizontal image segments 126 and 124, other horizontal image segments corresponding to other image rows (not shown) below image row 128 on media 102 are projected onto media 102 through CRT 114 and fiber optic bundle 120. The remaining two segments for each of these additional image rows (not shown) are also buffered within control module 100.

Control module 100 causes CRT 112 to project the second horizontal image segment 124 of image row 128 onto media 102 through fiber optic bundle 124 when media 102 has moved sufficiently to vertically align image row 128 with horizontal image segment 124. In like manner, control module 100 causes final horizontal image segment 122 to be projected onto media 102 through CRT 110 and fiber optic bundle 116 when image row 128 is vertically aligned with horizontal image segment 122. This process is repeated for each row of the entire length of the image to be projected onto media 102. The three CRTs of FIG. 1 are by way of example only. Those skilled in the art will recognize that any number of CRTs could be used to expose any desired width of media 102, that the media could be moved horizontally across the CRTs, or that the media could be stationary while being exposed, with the CRTs moving across the media in either the horizontal or vertical directions.

Figure 2:
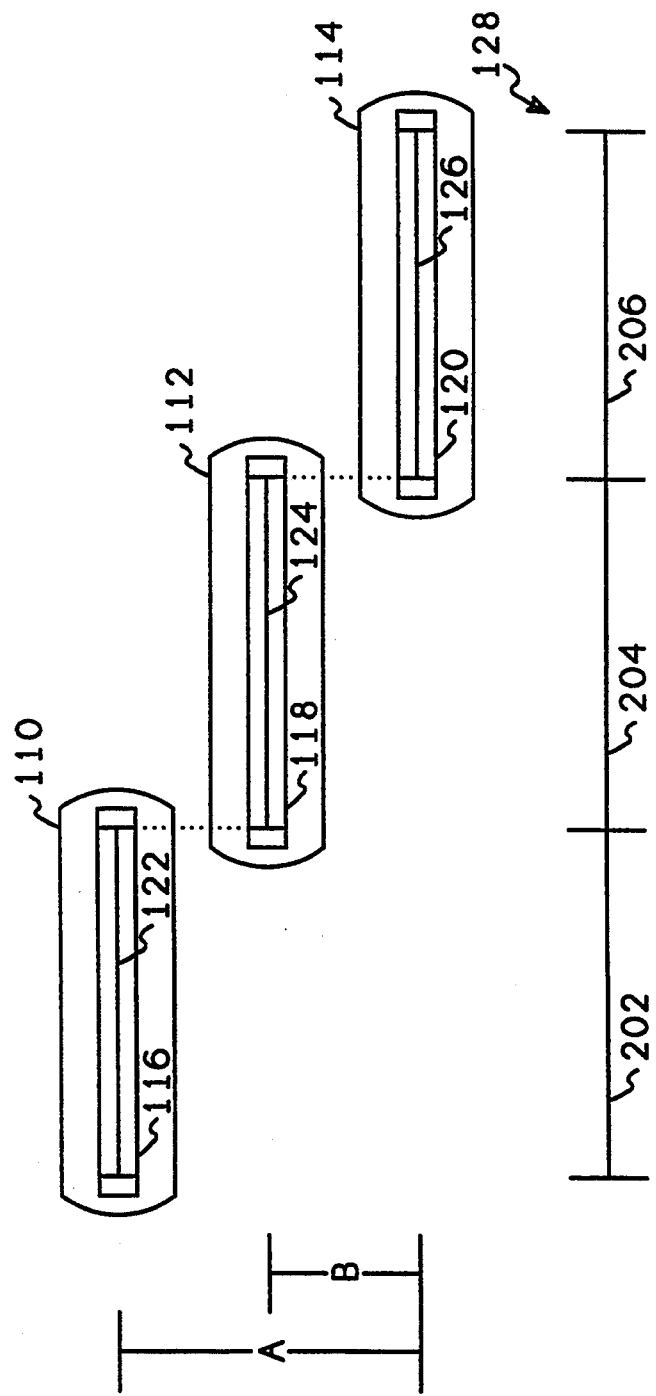
FIG. 2 shows a front view of the CRTs and optical fiber bundles of three staggered CRTs of the present invention.

FIG. 2 shows a front view of CRTs 110, 112, and 114 of FIG. 1. An apparatus and method for precisely mounting and adjusting CRTs within a printer device is taught by Sanford in U.S. Pat. No. 5,204,691 issued Apr. 20, 1993 which is hereby incorporated by reference for all that is disclosed and taught therein. The apparatus and methods taught by Sanford may be advantageously applied to the practice of the present invention to accurately position CRTs 110, 112, and 114 with respect to one another. Fiber optic bundles 116, 118, and 120 are attached to the front of CRTs 110, 112, and 114 respectively to transfer a focused horizontal image segment 122, 124, and 126 respectively from the front surface of CRTs 110, 112, and 114 onto media 102 (of FIG. 1). As image row 128 moves vertically upward with media 102 (as shown in FIG. 1), row segments 202, 204, and 206 will each be exposed as they are moved into vertical alignment with horizontal image segments 122, 124, and 126 respectively. The vertical distance in rows between horizontal image segments 124 and 126 (denoted "b" on FIG. 2) determines the number of rows of horizontal image segments which must be buffered within control module 100 as image row 128 moves between segments 124 and 126. The vertical distance in rows between horizontal image segments 122 and 126 (denoted "a" on FIG. 2) determines the number of rows of horizontal image segments which must be buffered within control module 100 as image row 128 moves between segments 122 and 126.

Figure 3:
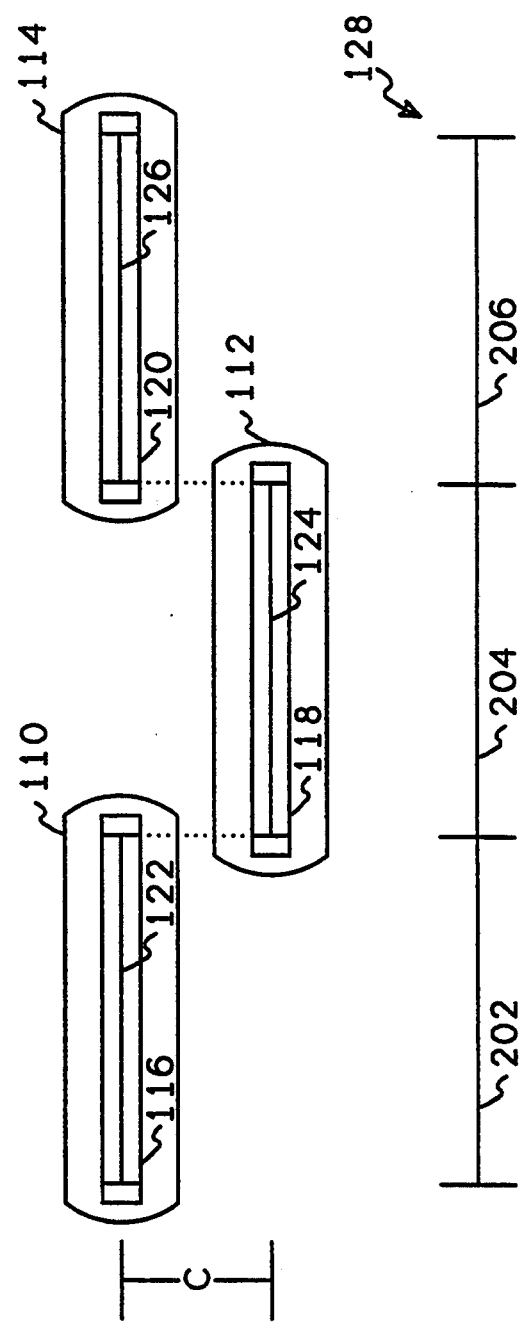
FIG. 3 shows an alternative embodiment for vertical staggering of three CRTs.

FIG. 3 shows an alternative preferred embodiment of aligning three CRTs 110, 112, and 114. CRTs 110 and 114 are vertically aligned with one another and equally displaced vertically from CRT 112 positioned horizontally between them. Row segments 202, 204, and 206 of image row 128 are each exposed as they are moved into vertical alignment with horizontal image segments 122, 124, and 126 respectively. The vertical distance in rows between horizontal image segments 122 and 124 ("c" on FIG. 3) determines the number of rows of horizontal image segments which must be buffered within control module 100 as image row 128 moves between segments 122 and 124. In this embodiment however, both horizontal image segments 122 and 126 are projected onto image row 128 simultaneously.

Figure 4:
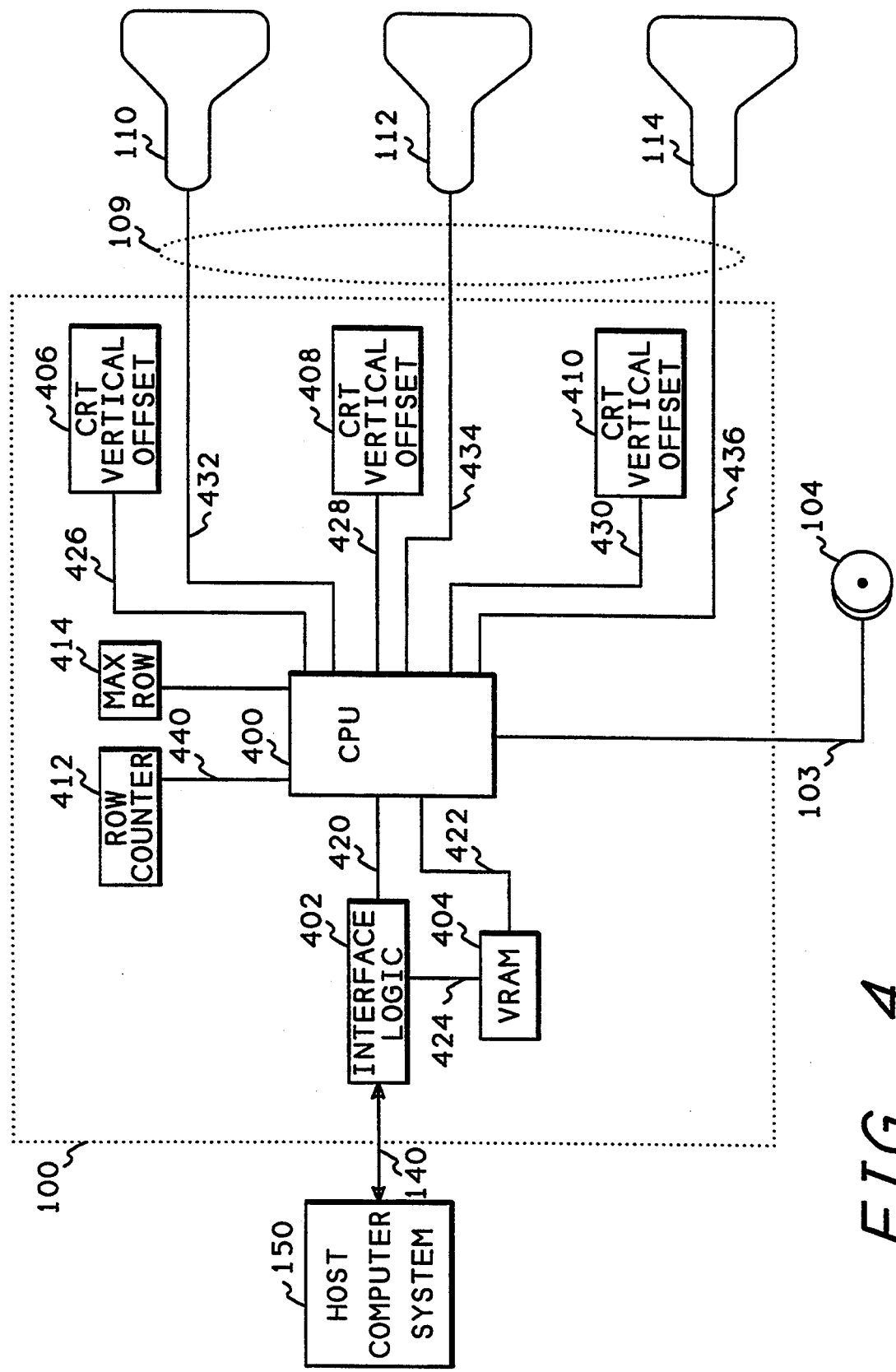
FIG. 4 shows a block diagram of the control mechanism to buffer, delay, and recompose the horizontally segmented images from a plurality of staggered CRTs.

FIG. 4 depicts additional detail of the design and operation of control module 100. Interface logic 402 receives commands and image data applied to host interface 140 by a host computer system 150. The received commands are applied over bus 420 to central processing unit 400 (CPU) for further interpretation and processing. Received image data is applied directly to video RAM 404 (VRAM) by interface logic 402 over bus 424. CPU 400 interprets the host commands received and causes the transfer of the image data from VRAM 404 to CRTs 110, 112, and 114 as required to reproduce the received image on a photosensitive media (not shown in FIG. 4). An apparatus and method for printer speed control based on rate of reception of host supplied image data is taught by Sturm et al. in U.S. Pat. No. 5,077,680 issued Dec. 31, 1991 and is hereby incorporated by reference for all that is disclosed and taught therein. The teachings of Sturm et al. in the '680 patent may be advantageously applied to the present invention to optimize the use of VRAM 404 memory for maximum print speed in view of the host communication rates.

CPU 400 controls servo motor 104 over bus 103 to move the media (not shown in FIG. 4) one row at a time vertically across the three CRTs 110, 112, and 114. As each row on the media is moved into vertical alignment with one of the CRTs 110, 112, or 114, the corresponding horizontal image segment of the image data is transferred by CPU 400 from VRAM 404 to the appropriate one of CRTs 110, 112, or 114. The image produced on CRT 110, 112, or 114 is exposed onto the photosensitive media and remains there as a latent image to be developed and fixed. The media is then moved to the next row and the process repeats until all rows of the media have been exposed.

CPU 400 divides each row of image data stored in VRAM 404 into three segments; one for each of CRTs 110, 112, and 114. Each segment of each row in VRAM 404 is transferred to one of CRTs 110, 112, or 114 over video bus 432, 434, and 436 respectively when the appropriate image row of the media (not shown) is vertically aligned with the CRT 110, 112, or 114 respectively. Although the CPU divides each row of image data into segments in the preferred embodiment, those skilled in the art will recognize that the dividing of the data into segments could be performed in the host computer system 150 or by other external circuitry.

As shown in FIGS. 2 and 3, CRTs 110, 112, and 114 are vertically staggered to permit the adjacent ends of the horizontal image segments displayed on the CRTs to abut or overlap. Max row register 414 is read by CPU 400 to determine the end of an image for a page. Max row register 414 may be set at the time of manufacture of the photographic printer device or may be set by CPU 400 in response to host computer system commands. Row counter register 412 is cleared to zero by CPU 400 at the start of each page and incremented by CPU 400 as the first horizontal image segment of each row begins to transfer to a CRT. CRT vertical offset registers 406, 408, and 410 each contain the relative offset in rows from the exposure of the first horizontal image segment until the exposure of the horizontal image segment for CRT 110, 112, and 114 respectively. CPU 400 uses row counter register 412 and the values in CRT vertical offset registers 406, 408, and 410 to determine which image row buffered in VRAM 404 is to be transferred next to CRTs 110, 112, and 114 respectively. Horizontal image segments are transferred to a particular CRT when row counter register 412 plus the corresponding vertical offset register is equal to an image row location value in the VRAM 404 for the image row. This delays the imaging of horizontal image segments until the desired image row on the media is aligned vertically with each of staggered CRTs 110, 112, and 114. For example, in the staggered arrangement of FIG. 2 CRT vertical offset registers 406, 408, and 410 would contain "a", "b", and zero respectively to reflect the offset in rows between each of CRTs 110, 112, and 114 and the first CRT to expose a horizontal image segment for a row. In the staggered arrangement of FIG. 3 CRT vertical offset registers 406, 408, and 410 would contain "c", zero, and "c" respectively to reflect the offset in rows between each of CRTs 110, 112, and 114 and the first CRT to expose a horizontal image segment for a row: specifically CRT 112.

The values stored in CRT vertical offset registers 406, 408, and 410 are determined by calibration procedures associated with the manufacture or maintenance of the photographic printer device. The values may be adjusted to account for tolerances inherent in the manufacture process. Slight misalignments of the CRTs relative to one another can be compensated by altering the nominal values in these registers.

Figure 5:
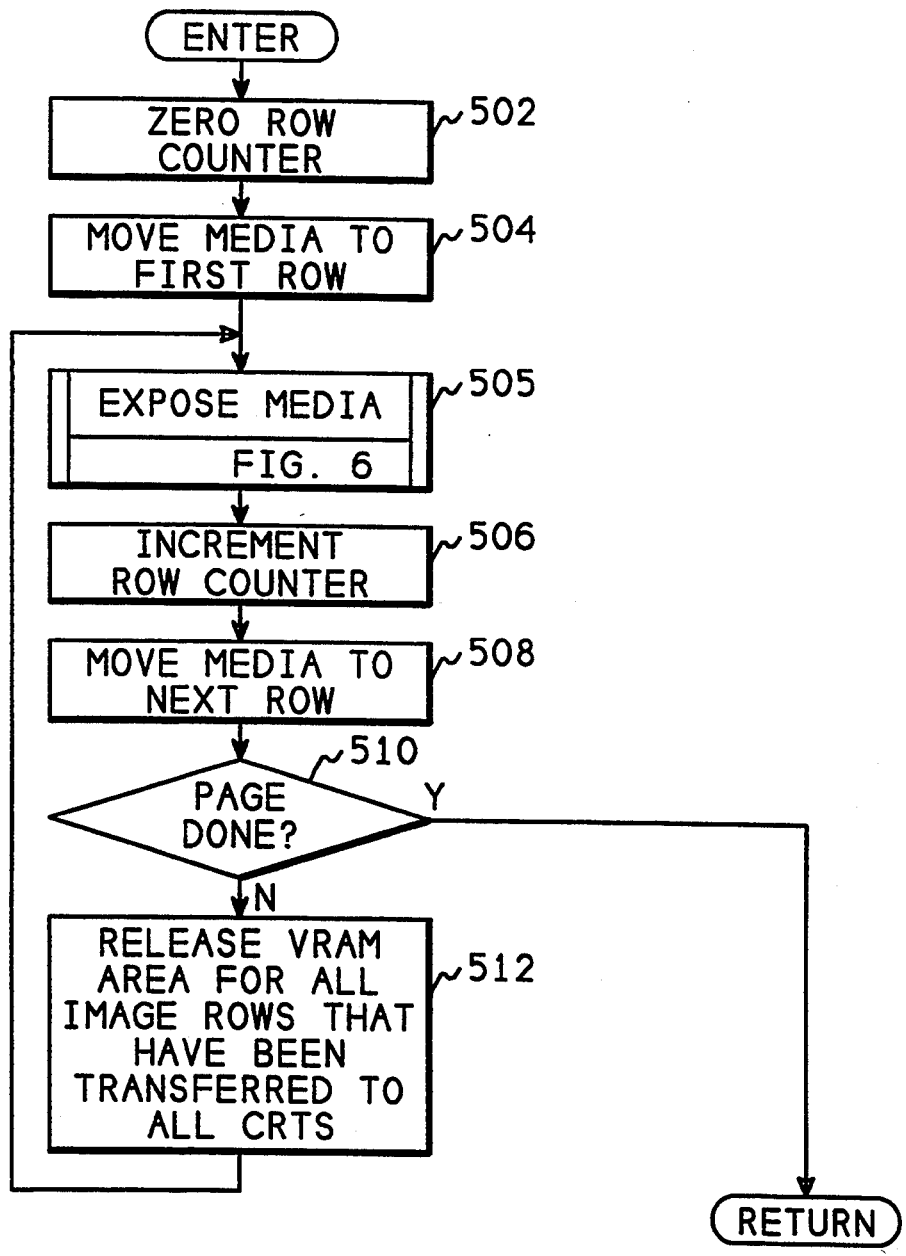
FIGS. 5 and 6 show a flowchart of the control methods of the present invention to buffer, delay, and recompose the horizontally segmented images using a plurality of staggered CRTs.
Figure 6:
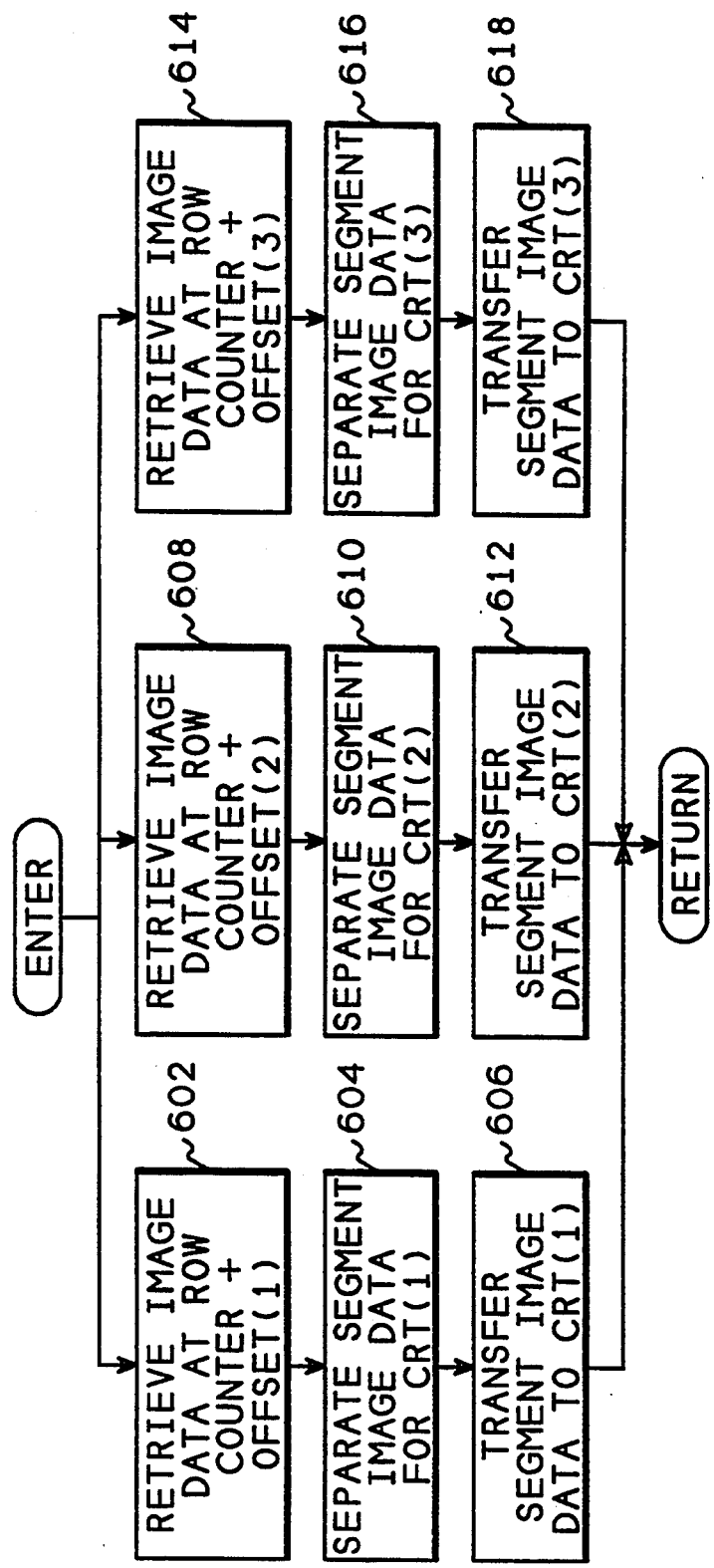

FIGS. 5 and 6 are a flowchart that describes the control methods applied by CPU 400 to delay the exposure of vertically staggered CRTs 110, 112, and 114 as shown in FIG. 2 and 3. The function performed by the steps depicted in the flowchart of FIG. 5 is performed once per page to expose an entire image onto photosensitive media 102. The steps depicted in FIG. 6 represent a subfunction invoked from within the functions performed in FIG. 5. The steps of FIG. 6 are depicted separately for visual clarity of the Figures.

Referring to FIGS. 5 and 6, after entry, block 502 of FIG. 5 clears row counter register 412 in preparation for exposing the image for a new page. Block 504 next controls servo motor 104 to move media 102 to the start position at the beginning of the media page for exposure of an image by CRTs 110, 112, and 114. Block 505 then calls FIG. 6 to transfer one row image to the CRTs.

In FIG. 6, three processes are performed concurrently, one for each CRT 110, 112, and 114. After entry to FIG. 6, block 602 retrieves image data from the VRAM 404 for the image row at an address represented by the row counter plus the vertical offset register 406 for the first CRT 110. Block 604 then separates the horizontal segment of the image row data that is to be displayed on the first CRT 110, and block 606 then transferrers this horizontal segment to the CRT 110.

Blocks 608, 610 and 612 perform the same function for the second CRT 112 that blocks 602, 604 and 606 performed for the first CRT 110. Likewise, blocks 614, 616, and 618 perform the function for the third CRT 114.

FIG. 6 then returns control to FIG. 5, block 506 which increments the row counter, and block 508 controls servo motor 104 to move media 102 to the next image row for processing. Block 510 determines whether all rows for the current page have been projected onto media 102 and, if so, returns to await another invocation for another page. If the page has not been completely exposed, block 510 goes to block 512 which frees all areas of VRAM 404 for image rows for which data has been sent to all the CRTs, since the data for these rows is no longer needed.

Figure 7:
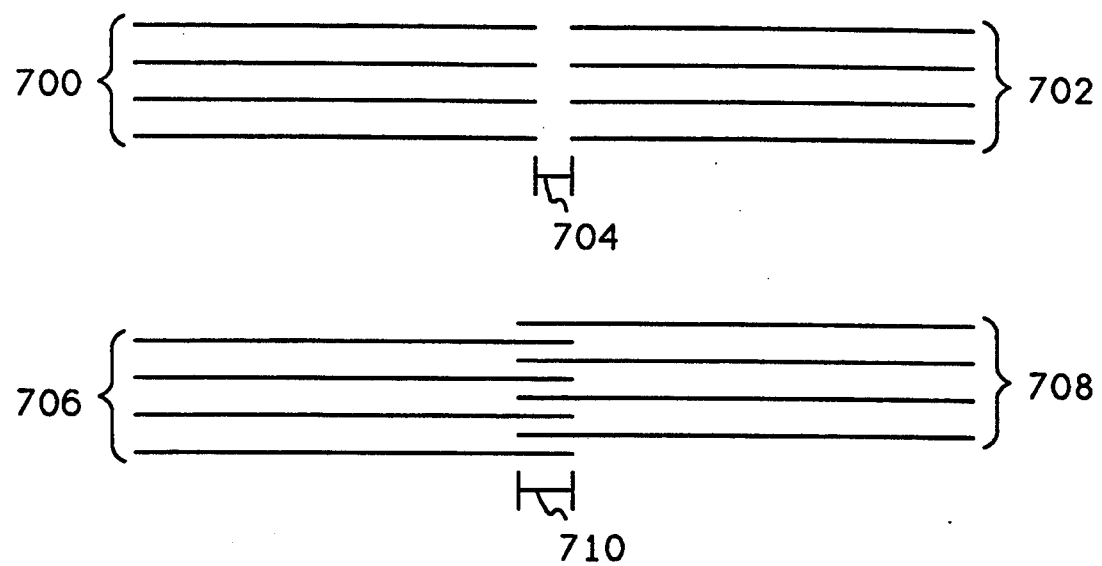
FIG. 7 shows examples of image artifacts that can occur when recomposing the horizontally segmented images.

For some applications of the present invention, the visual effects at the seam between two horizontal image segments exposed by adjacent CRTs will be acceptable. For other applications the visual effects may reveal an undesirable boundary at the seam between two adjacent horizontal image segments requiring compensation. FIG. 7 shows some possible visual effects at the seam between two adjacent CRT exposures.

Two cases are shown in FIG. 7. In both cases, the left side set of lines 700, and 706 represent horizontal image segments exposed by a first CRT and the right side set of lines 702, and 708 represent horizontal image segments exposed by a second CRT horizontally adjacent the first CRT, and vertically staggered with respect to the first CRT. The lines are replicated vertically to indicate the sequence of segment exposures by each CRT as the media is moved vertically across the plurality of CRTs. In both cases the region in which the visual discrepancies or artifacts are detectable are noted with a line indicating the length of the region 704, and 710.

The first case shows the visual effect of horizontally adjacent CRTs which cannot be physically aligned close enough to eliminate a gap between abutting ends. Gap 704 between left side segments 700 and right side segments 702 will appear on the developed print image as a light discontinuity (a light stripe) running vertically the length of the print. The visual anomaly is concentrated in a vertical swath having a width indicated by 704. This visual anomaly can be compensated by physically adjusting the mounting of the plurality of CRTs to draw them as close as possible to one another in terms of horizontal alignment for abutting.

The second case in FIG. 7 shows a similar effect to the first case, except that the lines overlap, rather than leave a gap as did the lines in the first case. Left side segments 706 are horizontally overlapped with right side segments 708. The width of overlap is indicated by 710.

Which of the two cases described above will be present in a printer is fixed at the time of manufacture of the photographic printer device or may be fixed during maintenance of a printer. At the time of manufacture of the photographic printer device, CRTs 110, 112, and 114 may be positioned to horizontally overlap adjacent horizontal image segments 122, 124, and 126. Additionally, CRTs 110, 112, and 114 are wider than required to expose their respective horizontal image segments 122, 124, and 126 to thereby permit the image segment to be shifted horizontally on its respective CRT 110, 112, or 114. As shown in FIGS. 2 and 3, each horizontal image segment 122, 124, and 126 may be adjusted left or right within the imageable area of CRT 110, 112, and 114 respectively as represented by fiber optic bundles 116, 118, and 120 respectively. CPU 400 may adjust the position of image segments 122, 124, and 126 by delaying or advancing the timing, blanking and data signals applied to each CRT 110, 112, or 114 over video bus 432, 434, and 436. CPU 400 moves an image segment left by advancing the associated video timing signals and moves the image segment right by delaying the video timing signals. In this manner, CPU 400 may cause adjacent horizontal image segments to horizontally overlap or to separate to form a gap between adjacent segments.

Applying similar principles, CPU 400 may vertically displace horizontally adjacent image segments by delaying the start of imaging for a particular horizontal image segment. The delay may be implemented by CPU 400 controls of servo motor 104 in advancing the media to the next vertical image row. CPU 400 may advance the media by fractional row increments to vertically displace adjacent image segments. In this manner, horizontally adjacent image segments may be vertically displaced as shown in FIG. 7.

Apparatus and methods for controlling the video timing of CRTs 110, 112, and 114 are taught by Rothe et al. in U.S. Pat. No. 5,239,243 which is hereby incorporated by reference for all that is disclosed and taught therein. The methods and apparatus taught in this patent may be advantageously applied to the present invention to control CRTs 110, 112, and 114 to achieve "stitching" of adjacent horizontal image segments as will be described below. CPU 400 may further reduce the perception of visual discontinuities by modifying the digital data as stored in VRAM 404 of FIG. 4 using dithering or other methods known to those skilled in the art. The modified digital data may then be applied to CRTs 110, 112, and 114 over video bus 432, 434, or 436 respectively in addition to the stitching methods described above.

Figure 8:
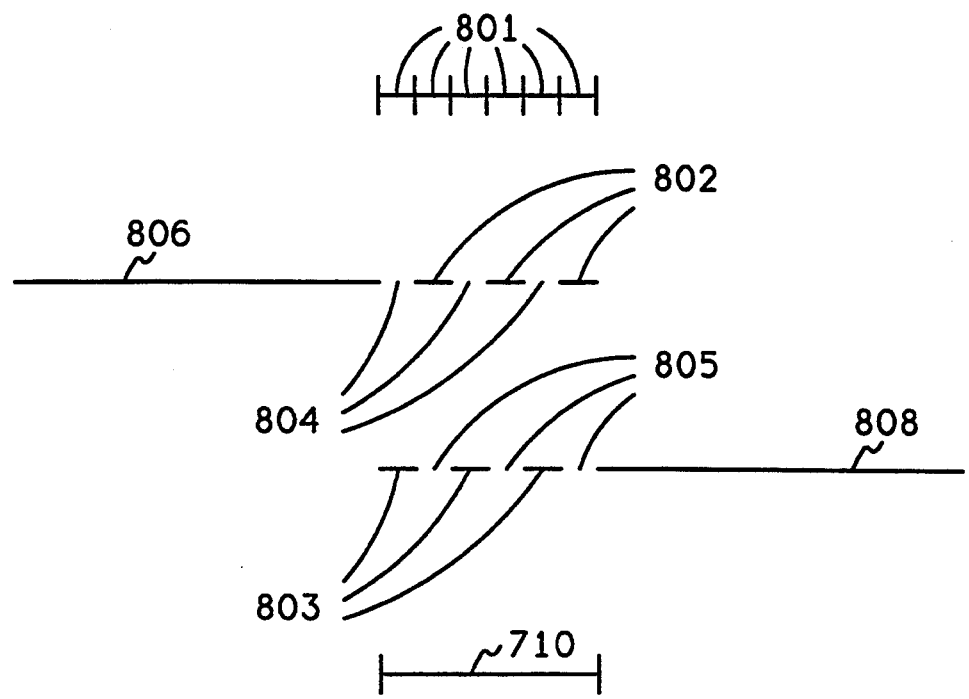
FIG. 8 shows a method of stitching the horizontally segments to remove the artifacts described in FIG. 7.

FIG. 8 shows a method of stitching of overlapping rows. FIG. 8 shows one pair of adjacent overlapping lines, 806 and 808, from the group of lines 706 and 708 (FIG. 7) respectively, which overlap by a total width indicated by 710. The region of overlap indicated by 710 is logically divided into a plurality of horizontal image subsegments, as illustrated by the subsegments 801 shown above the area 710. Alternating horizontal image subsegments 802, 803 on each horizontal image segment 806 and 808 respectively are projected by the corresponding CRT, and alternating image subsegments 804 and 805 are visually blanked from the CRT projection. Subsegments 802 are projected on horizontal image segment 806 but the corresponding subsegments 805 on horizontal image segment 808 are blanked; subsegments 803 are projected on horizontal image segment 808 but the corresponding subsegments 804 on horizontal image segment 806 are blanked.

The stitching of FIG. 8 can also be implemented by separating the image data for the horizontal segments into overlapping segments, such that the image data to be displayed in the overlap area is contained in both overlapping image data segments. The image data within the overlapping segments is then modified to create the alternating subsegments 802 and 803. That is, all the image data from line 806, including image data for the overlap area 710 would be separated into a first horizontal segment. All the image data from line 808, also including image data for the overlap area 710 would be separated into a second horizontal segment. The first horizontal segment image data would be modified before being sent to a CRT to change the color of the subsegments 804, which are to be blanked, into the color of unexposed media, by typically projecting no light from the CRT. The second horizontal segment image data would be modified, before being sent to a CRT, to change the color of the subsegments 805, which are to be blanked, into the color of unexposed media.

This stitching method helps to further reduce the visual perception of discontinuity at the seams of horizontally adjacent image segments projected onto media 102. Those skilled in the art will recognize that FIG. 8 is by way of example only. Any number of subsegments may be created and various sequences of projection and blanking of the CRT image may be employed within the scope of the present invention to achieve similar visual results.

Although the invention has been described using CRTs to project an image onto media, the invention is not so limited. Other techniques for transferring an image to media, such as wax transfer dye sublimation, liquid crystal, or plasma panels could also be used with the invention. The invention is usable in any application wherein more than one printing or exposure device is used to place a single image onto a medium.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably, defined in scope by the following claims.

What is claimed is:

1. A printer for transferring image data from a host computer system to a print media, and wherein media is moved linearly through said printer as said image is transferred to said media, said printer comprising:

a memory for storing said image data;

means for receiving said image data transferred from said host computer system and storing said image data into said memory means;

a plurality of image transfer means for transferring horizontal segments of said image onto said media as said media moves vertically across said plurality of image transfer means, wherein at least one of said plurality of image transfer means is vertically displaced with respect to at least one other of said plurality of image transfer means; and processing means operatively engaged with said memory means and with said image transfer means for retrieving said image data from said memory means, for decomposing said image data into a plurality of horizontal image segments, one of said plurality of said horizontal image segments for each of said plurality of image transfer means, for delaying at least one of said image segments, and for transferring said plurality of horizontal image segments to said plurality of image transfer means thereby to transfer said image segments to said media, wherein said image segments are recomposed as said image segments are transferred to said media.

2. The printer of claim 1 wherein said processing means further comprises control means for controlling said image transfer means to cause said image transfer means to adjust a width of each of said plurality of horizontal image segments as each of said plurality of horizontal image segments is transferred to said media to cause each of said plurality of horizontal image segments to abut an adjacent horizontal image segment.

3. The printer of claim 1 wherein said processing means further comprises means for further decomposing each of said plurality of horizontal image segments to provide overlap image data at at least one end of each of said horizontal image segments to cause each of said plurality of horizontal image segments to overlap an adjacent horizontal image segment when said horizontal image segments are transferred to said media.

4. The printer of claim 3 wherein said processing means further comprises means for further decomposing each of said plurality of horizontal image segments to provide subsegments within said overlap image data, and further to blank alternate ones of said subsegments in either end of each of said horizontal image segments, wherein blanked alternate subsegments within a horizontal image segment interlace with not-blanked alternate subsegments within an adjacent horizontal image segment when said horizontal image segments are transferred to said media.

5. The printer of claim 1 wherein said image transfer means comprises a cathode ray tube.

6. A photographic printer for transferring image data from a host computer system to expose a print media, and wherein media is moved linearly through said printer as said image is transferred to said media, said printer comprising:

a memory for storing said image data;

a host interface for receiving said image data transferred from said host computer system and storing said image data into said memory means;

a plurality of CRT means for transferring horizontal segments of said image onto said media as said media moves vertically across said plurality of CRT means, wherein at least one of said plurality of CRT means is vertically displaced with respect to at least one other of said plurality of CRT means; and processing means operatively engaged with said memory means and with said CRT means for retrieving said image data from said memory means, for decomposing said image data into a plurality of horizontal image segments, one of said plurality of said horizontal image segments for each of said plurality of CRT means, for delaying at least one of said image segments, and for transferring said plurality of horizontal image segments to said plurality of CRT means thereby to transfer said image segments to said media, wherein said image segments are recomposed as said image segments are transferred to said media.

7. The printer of claim 6 wherein said processing means further comprises control means for controlling said CRT means to cause said CRT means to adjust a width of each of said plurality of horizontal image segments as each of said plurality of horizontal image segments is transferred to said media to cause each of said plurality of horizontal image segments to abut an adjacent horizontal image segment.

8. The printer of claim 6 wherein said processing means further comprises means for further decomposing each of said plurality of horizontal image segments to provide overlap image data at at least one end of each of said horizontal image segments to cause each of said plurality of horizontal image segments to overlap an adjacent horizontal image segment when said horizontal image segments are transferred to said media.

9. The printer of claim 8 wherein said processing means further comprises means for further decomposing each of said plurality of horizontal image segments to provide subsegments within said overlap image data, and further to blank alternate ones of said subsegments in either end of each of said horizontal image segments, wherein blanked alternate subsegments within a horizontal image segment interlace with not-blanked alternate subsegments within an adjacent horizontal image segment when said horizontal image segments are transferred to said media.

10. A printer for transferring image data from a host computer system to a print media, wherein said image data has been decomposed by said host computer into a plurality of horizontal image lines each having a plurality of horizontal image segments, and wherein media is moved linearly through said printer as said image is transferred to said media, said printer comprising:

a memory for storing said image data;

a host interface for receiving said image data transferred from said host computer system and storing said image data into said memory means;

a plurality of image transfer means for transferring said horizontal image segments of said horizontal image lines onto said media as said media moves vertically across said plurality of image transfer means, wherein at least one of said plurality of image transfer means is vertically displaced with respect to at least one other of said plurality of image transfer means; and processing means operatively engaged with said memory means and with said image transfer means for retrieving said plurality of horizontal image segments from said memory means, for delaying at least one of said horizontal image segments, and for transferring said plurality of horizontal image segments to said plurality of horizontal image transfer means thereby to transfer said horizontal image segments to said media, wherein said image segments are recomposed as said image segments are transferred to said media.

11. The printer of claim 10 wherein said processing means further comprises control means for controlling said image transfer means to cause said image transfer means to adjust a width of each of said plurality of horizontal image segments as each of said plurality of horizontal image segments is transferred to said media to cause each of said plurality of horizontal image segments to abut an adjacent horizontal image segment.

12. The printer of claim 10 wherein said image transfer means comprises a cathode ray tube.

* * * * *